United States Patent [19]

Blankenhagen et al.

[11] Patent Number: 4,883,638
[45] Date of Patent: Nov. 28, 1989

[54] METHOD AND DEVICE FOR PRODUCING A FRICTION OR RUBBING ELEMENT

[75] Inventors: Fred Blankenhagen, Penzberg; Hermann Pütz, Schongau, both of Fed. Rep. of Germany

[73] Assignee: Enfo Grundlagenforschungs AG, Döttingen, Switzerland

[21] Appl. No.: 192,700

[22] Filed: May 10, 1988

[30] Foreign Application Priority Data

May 20, 1987 [AT] Austria ................... 1282/87

[51] Int. Cl.$^4$ .............................................. B22F 7/00
[52] U.S. Cl. .......................................... 419/9; 419/13; 419/6; 428/548
[58] Field of Search ................ 419/9, 13, 6; 428/548

[56] References Cited

U.S. PATENT DOCUMENTS 4,435,480  3/1984  Mizuhara ........................... 428/548
4,470,953  9/1984  Bruce .................................... 419/6
4,750,667  6/1988  Takahashi et al. ................. 419/13

FOREIGN PATENT DOCUMENTS 3417813  6/1985  Fed. Rep. of Germany .
1325304  8/1973  United Kingdom .

Primary Examiner—Stephen J. Lechert, Jr.
Assistant Examiner—Nina Bhat
Attorney, Agent, or Firm—Watson, Cole, Grindle & Watson

[57] ABSTRACT

A friction or rubbing element for clutches, brakes, bearings or the like consists of a metal ring element with at least one uneven friction or rubbing surface which is substantially rotationally symmetrical about the ring axis and comprises a spray-sintered lining directly sintered thereon. To produce this lining the ring element is arranged in a level position together with a sinter mould disposed substantially concentrically to the side of the friction or rubbing surface in such a manner as to maintain an annular gap. After filling the annular gap with sinter powder, the complete assembly is heated to sintering temperature. The sinter mould material has a coefficient of thermal expansion which in the case of an internal sinter mould is greater than and in the case of an external sinter mould is less than that of the ring element, pressure being applied during sintering by virtue of the different temperature expansion.

3 Claims, 2 Drawing Sheets

METHOD AND DEVICE FOR PRODUCING A FRICTION OR RUBBING ELEMENT

SUMMARY OF THE INVENTION

The invention relates to a method and device for producing a friction or rubbing element for clutches, brakes, bearings or the like, which consists of a metal ring element with at least one uneven friction or rubbing surface which is substantially rotationally symmetrical about the ring axis and to which a spray-sintered lining is applied, the ring element being placed in an at least largely level position together with a sinter mould disposed substantially concentrically to the side of the friction or rubbing surface in such a manner as to maintain an annular gap, the annular gap being filled with sinter powder, sintering being carried out at sintering temperature, and the spray-sintered lining being compacted.

Spray-sintered linings have been successfully used for a long time as friction linings in clutches and brakes and as rubbing linings in bearings, as depending on their material composition they possess good friction or rubbing properties, are durable and temperature-resistant and can be produced comparatively easily with great accuracy. In the production of known linings, the sinter powder is sprayed onto a plane support plate and then sintered thereon at the corresponding temperature, the necessary material density and required gauged thickness being attained by one or more compacting operations. Discs produced by this method have given satisfactory results in lubricated multiple disc clutches and brakes of various types, and also for example in automatic change-over gears of motor vehicles and other working machines of all types.

From DE-PS No. 34 17 813 a friction element of the initially described type is know, which for use in a friction clutch or brake, particularly in a synchronising device, is provided with a non-plane friction surface which is rotationally symmetrical about the axis of the metal ring element and is substantially in the form of a frusto-conical surface. This friction surface is formed on a separately prepared support element which consists of deepdrawable steel plate or a similar material and before its final shaping is provided while in its plane shape with the spray-sintered lining. The finished support element in the form of a plane disc is then shaped at least approximately into the required friction surface shape and then by rolling, including the use of engraved rollers, is fitted onto a separate basic element so that it becomes friction-locked and at least over parts of its surface positively locked, and is then brazed, welded or fixed in some other manner thereon. This known friction element with non-plane, substantially rotationally symmetrical friction surfaces is thus composed of individual parts, so that not only is it comparatively costly and particularly troublesome to manufacture, but unavoidably high tolerances are present due to the adding together of the individual part tolerances.

A further friction element of the initially described type is known for example from GB patent No. 1 325 304. In this, a substantially cylindrical brake band open in a circumferential position is provided with a brake lining consisting of a support in the form of a flexible steel band with a spray-sintered friction lining applied thereon and which is fixed to the brake band by spot welding. This known execution also uses a separately prepared friction element, and therefore conforms substantially to the aforesaid known arrangement and has substantially the same drawbacks.

The object of the invention is to improve the initially described method and device for producing friction or rubbing elements such that the known drawbacks do not occur and that in particular friction or rubbing elements of any desired shape with non-plane spray-sintered linings can be easily produced without having to reckon with large manufacturing tolerances arising from having to fit separate additional parts provided with the spray-sintered lining to the friction or rubbing surfaces of the ring element. This object is attained as a further development of the initially described method in that in order to compact the the sinter powder contained in the annular gap at sintering temperature, a sinter mould is used of a material having a coefficient of thermal expansion which is different from that of the ring element, and which in the case of an internal sinter mould is greater than and in the case of an external sinter mould is less than that of the ring element. This further development makes use of the fact that in using this production method the inserted sinter powder is practically enclosed as far as the end opening in the gap through which the sinter powder is poured, namely on one side of the friction or rubbing surface of the metal ring element and on the other side by the sinter mould which is substantially concentric thereto. On heating to sintering temperature, the two parts which enclose the contained sinter powder expand differently in accordance with their coefficient of thermal expansion, and this provides the pressure application required for compacting during the sintering itself, without any additional process step being necessary. If the ring element is to be sintered on its inside, a sinter mould with a coefficient of thermal expansion greater than that of the ring element material is used; if the ring element is to be sintered on its outer circumference, a sinter mould with a coefficient of thermal expansion smaller than that of the ring element material is used. By this means the overall production process is simplified as the friction or rubbing element is completely finished after sintering the lining.

According to a further embodiment of the invention, in order to vary the applied pressure at sintering temperature sinter moulds of materials with different coefficients of thermal expansion can be used, which by interchangeability and mutual coordination allow maximum effect on, and proper allowance to be made for, the widest possible range of sinter materials and the like.

In a further embodiment of the production method according to the invention in the case of steel, sintered steel or brass ring elements, interior sinter moulds of X 12 CrNi 188 steel and/or exterior sinter moulds of X 20 Cr 13 steel or ceramic are used. These material combinations have proved to be the best for the sinter powders used for friction or rubbing linings, and ensure the most satisfactory pressure application at sintering temperature.

A device for producing a friction or rubbing element for clutches, brakes, bearings or the like in the form of a metal ring element with at least one non-plane friction or rubbing surface formed from a spray-sintered lining substantially rotationally symmetrical about the ring axis comprises a sinter mould which conforms to, and can be centered with respect to, the friction or rubbing surface of the ring element so as to maintain an annular gap.

According to the invention, the sinter mould consists of a material having a coefficient of thermal expansion which is different from that of the ring element and which in the case of an interior sinter mould is greater than and in the case of an exterior sinter mould smaller than that of the ring element. By this means the aforesaid simplicity of the production method according to the invention is attained in that on jointly heating up to sintering temperature the ring element, the sinter mould and the sinter powder poured into the annular gap formed between them, a compacting or precompacting of the sinter powder or the forming spray-sintered lining is obtained.

In a preferred embodiment of the device according to the invention, the sinter mould is in two parts, of which the first is a centering part both for the ring element and for the second mould part which in cooperation with the friction or rubbing surface on the ring element forms the annular gap to be filled with sinter powder. By this means the two parts which directly bound the annular gap to be filled are mutually centered on a centering part, so simplifying the accurate application of the spray-sintered lining.

In a further improvement of the device according to the invention, the sinter mould consists of a material which does not combine at sintering temperature with the sinter powder used.

In a further advantageous development of the device according to the invention, in the case of a steel, sintered steel or brass ring element, the interior sinter mould consists of X 12 CrNi 188 steel and/or the exterior sinter mould consists of X 20 Cr 13 steel or ceramic. As already stated in relation to the production method accordingn to the invention, these material combinations have proved to be the best for ensuring high-quality linings with the spray-sinter powders currently used for friction or rubbing linings and the appropriate pressures to be used for their sintering.

In a further embodiment of the device according to the invention, that region of the sinter mould which together with the ring element forms the annular gap can have a cross-section or section modulus of such a size that in cooperation with the cross-section or section modulus of the ring element and the difference in the two coefficients of thermal expansion, the required compacting pressure is attained at sintering temperature. By this means, further control of the pressure exerted on the sinter powder or on the spray-sintered lining at sintering temperature is possible by virtue of the constructional shape of the sinter mould or ring element.

Finally, in a further preferred embodiment of the device according to the invention, that region of the sinter mould facing the annular gap can be provided with profiles for oil grooves or oil drainage grooves in the spray-sintered lining, thus making it possible to provide such grooves without any after-machining of the lining.

The invention is described in detail hereinafter with reference to the drawings, in which.

Figure 1:
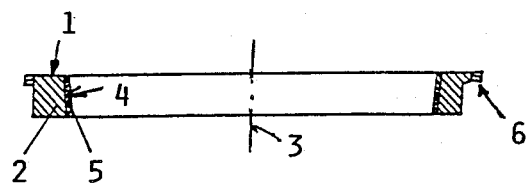
FIG. 1 is a diagrammatic cross-section through a friction element produced in accordance with the invention.
Figure 2:
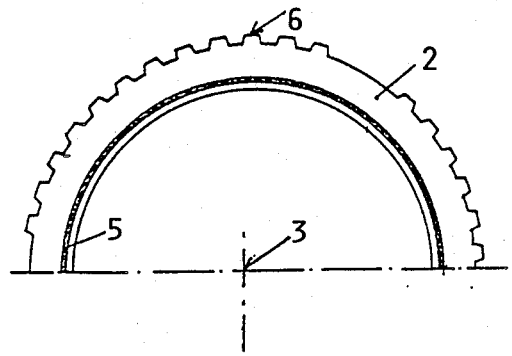
FIG. 2 is a partial plan view of the friction element of FIG. 1.

The friction element 1 shown in FIGS. 1 and 2 consists of a ring element 2 with a friction surface 4 in the form of a frustoconical covering rotationally symmetrical about the ring axis 3 and comprising a spray-sintered layer 5. The ring elmeent 2 is constructed of metal, such as steel, sintered steel or brass. The lining 5 which is directly sintered onto the friction surface 4 of the friction element 2 is of suitable sinter powder applied by the method described hereinafter with reference to FIG. 3.

On the outer periphery of the friction element 1 or ring element 2 toothing 6 can be seen, which is used for fixing the friction ring in relation to the components of a clutch, a brake or a changeover gear, which are not illustrated herein.

Figure 3:
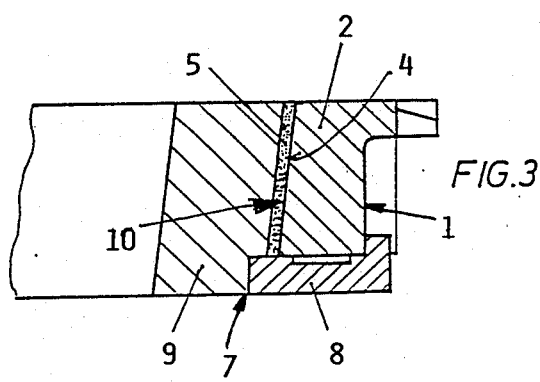
FIG. 3 is a partial cross-section to an enlarged scale through a device according to the invention during the production of the friction element shown in FIGS. 1 and 2.

The great advantage of the illustrated friction element 1 is its simple and precise production, which will now be described with reference to FIG. 3. As stated heretofore, the spray-sintered lining 5 is directly sintered onto the conical and thus non-plane friction surface 4 of the ring element 2, the ring element 2 being firstly placed in a largely level position together with a sinter mould 7 disposed concentrically to the side of the friction surface 4 in such a manner as to maintain an annular gap 10 (which in FIG. 3 is shown already filled with the spray-sinter powder or with the finished spray-sintered lining 5). The sinter mould consists of two parts 8, 9, the first part 8 of which acts as a centering part both for the ring element 2 and for the second mould part 9 which in cooperation with the friction surface 4 on the ring element 2 forms the annular gap to be filled with sinter powder. In this way the width of the annular gap 10 is exactly fixed. The annular gap 10 is then filled with sinter powder, for which, if necessary and particularly in the case of narrow gaps, reliable filling and ease of precompacting can be attained for example by appropriately choosing a particular particle size distribution of the lining powder. The whole assembly show in FIG. 3 is then heated to sintering temperature, for example in an oven not illustrated herein, by which the sinter powder contained in the annular gap 10 sinters to form the lining 5. To facilitate the sintering and binding procedure, a pressure is exerted on the sinter powder in the annular gap 10 at the sintering temperature by the sinter mould 7, this pressure being generated by making the sinter mould 7 of a material having a greater coefficient of thermal expansion than the ring element 2, thus in the illustrated embodiment the two parts 8, 9 of the sinter mould 7 can consist for example of X 12 CrNi 188 steel. If necessary, after removing the sinter mould 7 the spray-sintered lining 5 can be profiled or gauged by subsequent cold pressing or the like.

Figure 4:
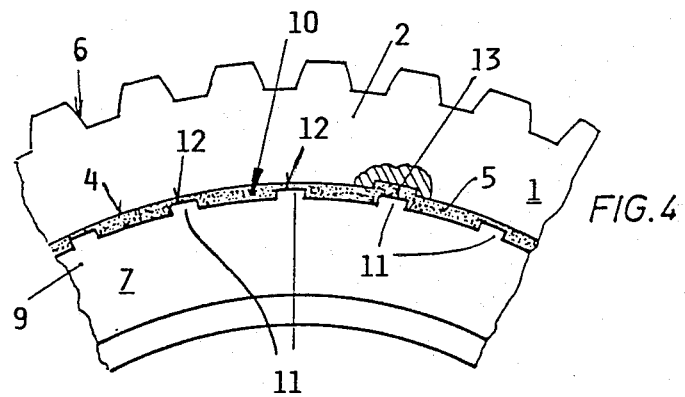
FIG. 4 is a partial plan view of a further embodiment of a device according to the invention for the production of a friction or rubbing element.

In the embodiment of a device for producing a friction element 1 provided with a spray-sintered lining shown in FIG. 4, the outer region of the sinter mould 7 facing the annular gap 10 - of which mould only the second respective mould part 9 can be seen hereis provided with rectangular cross-section or similar profiles 11 for oil grooves 12 in the spray-sintered lining 5. In addition, groove shaped depressions 13 are machined into the friction surface 4 on the ring element 2, in order to also assist positive locking of the sintered lining 5 onto the ring element 2. Apart from this, such assistance could also be provided for example by simply roughening or roughly producing the friction surface 4.

Figure 5:
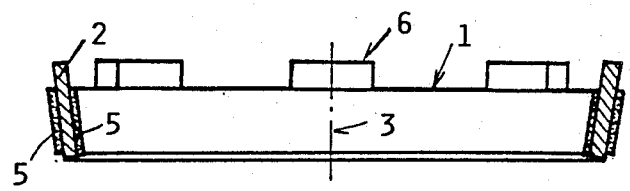
FIGS. 5 and 6 show a double-sided sintered friction element according to the invention in views corresponding to FIGS. 1 and 2 respectively.
Figure 6:
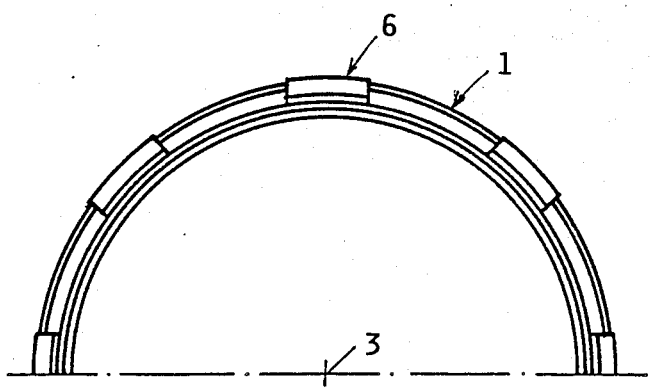
Figure 7:
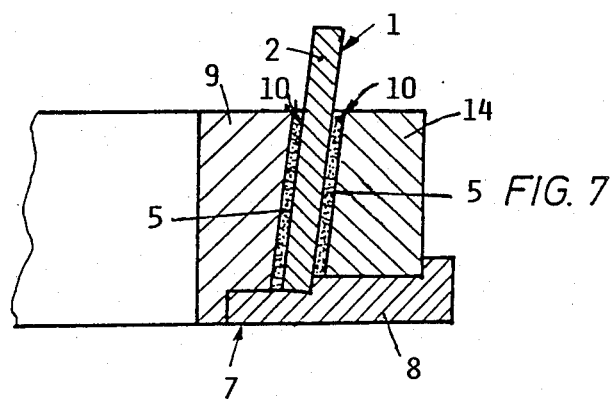
FIG. 7 is a view corresponding to FIG. 3 showing a device for producing the friction element shown in FIGS. 5 and 6.

The friction element 1 shown in FIGS. 5 to 7 is provided both on its inside and outside with a spray-sintered lining 5, the ring element 2 being formed as part of a cone-shaped shell which can be constructed for example as a sheet metal pressing or the like. The toothing 6 is here in the form of individual dogs distributed over the circumference of the ring element 2.

The sinter mould shown in FIG. 7 consists substantially of three parts, the first part 3 serving, as in FIG. 3, for setting and centering not only the ring element 2 but also the two other parts 9 and 14 of the sinter mould 7. On each side of the ring element 2 there is now a respective separate annular gap 10 (which in FIG. 3 is also shown filled with the sinter powder or finished spray-sintered lining 5). The inner part 9 of the sinter mould 7 consists of a material having a greater coefficient of thermal expansion than the ring element 2, whereas the outer part 14 of the sinter mould 7 consists of a material having a smaller coefficient of thermal expansion than the ring element 2, so that on heating the overall assembly shown in FIG. 7 to sintering temperature, for example in an oven not shown herein, a pressure is exerted on the sinter powder in the annular gaps 10, which both inplements and improves the compacting of the spray-sintered lining and its adhesion to the ring element.

What is claimed is:

1. A method for producing a friction or rubbing element for clutches, brakes, bearings or the like, which consists of a metal ring element with at least one uneven friction or rubbing surface which is substantially rotationally symmetrical about the ring axis and to which a spray-sintered lining is applied, the ring element being placed in an at least largely level position together with a sinter mould disposed substantially concentrically to the side of the friction or rubbing surface in such a manner as to maintain an annular gap, the annular gap being filled with sinter powder, sintering being carried out at sintering temperature, and the spray-sintered lining being compacted, characterised in that in order to compact the the sinter powder contained in the annular gap (10) at sintering temperature, a sinter mould (7) is used of a material having a coefficient of thermal expansion which is different from that of the ring element (2), and which in the case of an internal sinter mould (7) is greater than and in the case of an external sinter mould is less than that of the ring element (2).

2. A method as claimed in claim 1, characterised in that in order to vary the applied pressure at sintering temperature sinter moulds (7) of materials with different coefficients of thermal expansion are used.

3. A method as claimed in claim 1 or 2, characterised in that in the case of steel, sintered steel or brass ring elements (2), interior sinter moulds (7) of X 12 CrNi 188 steel and/or exterior sinter moulds of X 20 Cr 13 steel or ceramic are used.

* * * * *